United States Patent
Hsieh et al.

(10) Patent No.: US 10,510,359 B1
(45) Date of Patent: Dec. 17, 2019

(54) COMMAND PROCESSING DEVICE AND METHOD

(71) Applicant: Quanta Computer Inc., Taoyuan (TW)

(72) Inventors: Yu-Lin Hsieh, Taoyuan (TW);
Chieh-Sheng Ding, Taoyuan (TW);
Ming-Ju Tsai, Taoyuan (TW);
Jyun-Ching Luo, Taoyuan (TW);
Ming-Tsung Yen, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 16/242,310

(22) Filed: Jan. 8, 2019

(30) Foreign Application Priority Data

Sep. 6, 2018 (TW) .............................. 107131214 A

(51) Int. Cl.
| | |
|---|---|
| *G06F 3/16* | (2006.01) |
| *G10L 21/0224* | (2013.01) |
| *H04R 3/04* | (2006.01) |
| *G10L 19/008* | (2013.01) |
| *G10L 21/0208* | (2013.01) |

(52) U.S. Cl.
CPC .......... *G10L 21/0224* (2013.01); *G06F 3/167* (2013.01); *G10L 19/008* (2013.01); *H04R 3/04* (2013.01); *G10L 2021/02085* (2013.01)

(58) Field of Classification Search
USPC ........................................................ 700/94
See application file for complete search history.

(56) References Cited

U.S. PATENT DOCUMENTS

| | | | | |
|---|---|---|---|---|
| 2004/0234000 | A1* | 11/2004 | Page .................... | H04J 3/00 |
| | | | | 375/259 |
| 2009/0024235 | A1* | 1/2009 | Kim .................... | G10L 19/167 |
| | | | | 700/94 |
| 2013/0322439 | A1* | 12/2013 | Verhallen ............ | H04J 3/12 |
| | | | | 370/389 |
| 2016/0260321 | A1* | 9/2016 | Hsieh .................. | G08C 23/02 |

FOREIGN PATENT DOCUMENTS

JP          4841759 B2    12/2011

OTHER PUBLICATIONS

Chinese language office action dated Oct. 25, 2019, issued in application No. TW 107131214.

* cited by examiner

*Primary Examiner* — James K Mooney
(74) *Attorney, Agent, or Firm* — McClure, Qualey & Rodack, LLP

(57) ABSTRACT

A command processing device and method are provided. The command processing device includes a receiving device and a processing device. The receiving device receives an audio signal from an electronic device, wherein the audio data includes data signals and clock signals, and the data signals correspond to a first sound channel and the clock signals correspond to a second sound channel. The processing device is coupled to the receiving device. The processing device obtains the data signals from the first sound channel, and obtains the clock signals from the second sound channel. The processing device obtains one or more commands according to the data signals and clock signals, and performs operations corresponding to the commands.

10 Claims, 6 Drawing Sheets

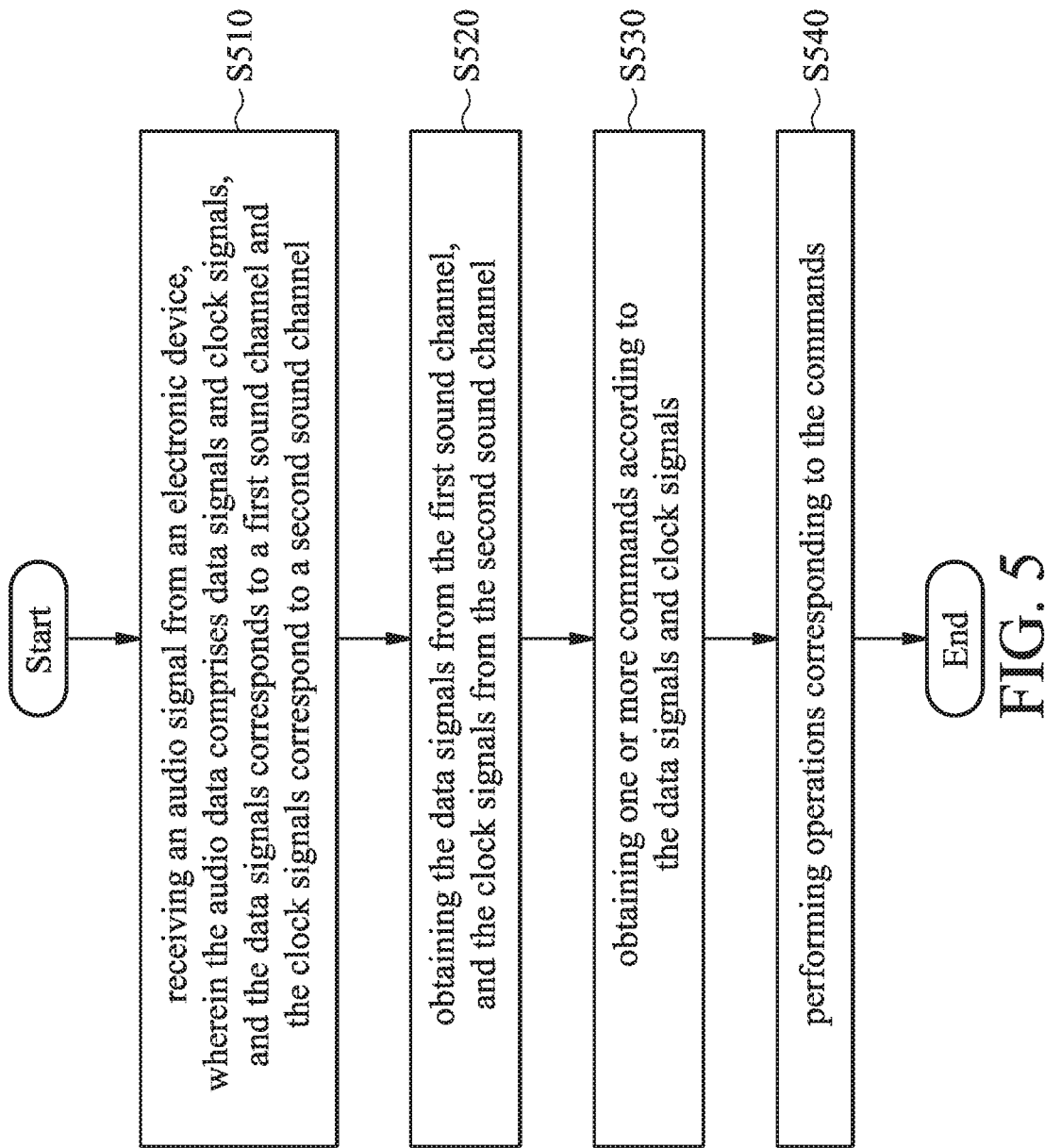

COMMAND PROCESSING DEVICE AND METHOD

CROSS REFERENCE TO RELATED APPLICATIONS

This Application claims priority of Taiwan Patent Application No. 107131214, filed on Sep. 6, 2018, the entirety of which is incorporated by reference herein.

BACKGROUND OF THE INVENTION

Field of the Invention

The invention generally relates to a command processing technology, and more particularly, to command processing technology for transmitting commands through an audio signal.

Description of the Related Art

In the instant messengers employed by the current generation of smartphones, the application programming interface (API) for transmitting commands is unopened currently. As a result, the commands cannot be directly transmitted to another electronic device through the instant messengers.

Therefore, how to transmit commands to another electronic device is a subject it is worth discussing.

BRIEF SUMMARY OF THE INVENTION

A command processing device and method are provided to overcome the problems mentioned above.

An embodiment of the invention provides a command processing device. The command processing device comprises a receiving device and a processing device. The receiving device receives an audio signal from an electronic device, wherein the audio data comprises data signals and clock signals, and the data signals correspond to a first sound channel and the clock signals correspond to the second sound channel. The processing device is coupled to the receiving device. The processing device obtains the data signals from the first sound channel, and obtains the clock signals from the second sound channel. The processing device obtains one or more commands according to the data signals and clock signals, and performs operations corresponding to the commands.

In some embodiments, at each rising edge of the clock signals, the processing device extracts signals from the data signals, and decodes the extracted data signals to obtain the commands.

An embodiment of the invention provides a command processing method. The command processing method is applied to a command processing device. The command processing method comprises the steps of receiving, an audio signal from an electronic device by a receiving device of the command processing device, wherein the audio data comprises data signals and clock signals, and the data signals corresponds to a first sound channel and the clock signals correspond to the second sound channel; and obtaining the data signals from the first sound channel, and the clock signals from the second sound channel by a processing device of the command processing device; obtaining one or more commands according to the data signals and clock signals by the processing device; and performing operations corresponding to the commands by the processing device.

Other aspects and features of the invention will become apparent to those with ordinary skill in the art upon review of the following descriptions of specific embodiments of command processing devices and methods.

BRIEF DESCRIPTION OF THE DRAWINGS

The invention will become more fully understood by referring to the following detailed description with reference to the accompanying drawings, wherein:

FIG. 5 is a flow chart 500 illustrating the command processing method according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
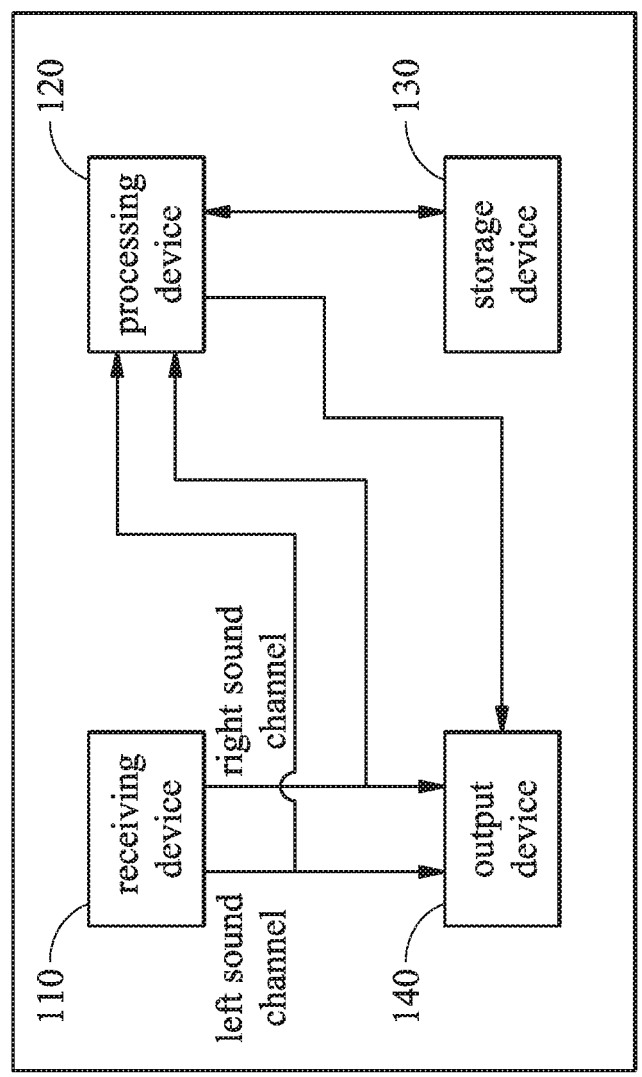
FIG. 1 is a block diagram of a command processing device 100 according to an embodiment of the invention.

FIG. 1 is a block diagram of a command processing device 100 according to an embodiment of the invention. According to an embodiment of the invention, the command processing device may be an electronic device which can play audio signals, e.g. a loudspeaker, but the invention should not be limited thereto. As shown in FIG. 1, the command processing device 100 may comprise a receiving device 110, a processing device 120, a storage device 130 and an output device 140. It should be noted that, in order to clarify the concept of the invention, FIG. 1 presents a simplified block diagram in which only the elements relevant to the invention are shown. However, the invention should not be limited to what is shown in FIG. 1. The command processing device 100 may comprise other elements.

According to an embodiment of the invention, when the user wants to transmit one or more commands to the processing device, the user may perform an audio file in an electronic device (e.g. a smartphone, but the invention should not be limited thereto) to generate an audio signal. The audio file may be a pre-designed signal. When the audio file is performed, the audio signal will be generated and one or more commands which the user wants to transmit will be carried on the audio signal. In addition, the audio file may be transmitted from another electronic device to the electronic device through an instant messenger.

After the electronic device transmits the audio signal to the external command processing device 100, the command processing device 100 may play the audio signal and obtain the commands carried on the audio signal. Therefore, in the embodiment, the commands which the user wants to transmit to the command processing device 100 can be transmitted to the command processing device 100 through the audio signal. Details will be illustrated in following embodiments.

According to an embodiment of the invention, the receiving device 110 of the command processing device 100 may receive the audio signal from the electronic device through a wire communication method (e.g. through earphones) or through a wireless communication method (e.g. through the Bluetooth communication). According to an embodiment of the invention, the audio signal received by the receiving device may comprise data signals and clock signals. The data signals may correspond to a first sound channel (e.g. the left sound channel) and the clock signals may correspond to the second sound channel (e.g. the right sound channel). According to an embodiment of the invention, the clock signals may comprise one or more groups of clock signals, and the data signal may comprise one or more data groups. Each data group may correspond to one group of clock signals, and each data group may correspond to its corresponding command.

According to an embodiment of the invention, the commands may be allocated in the front-end of the data signal.

Figure 2A:
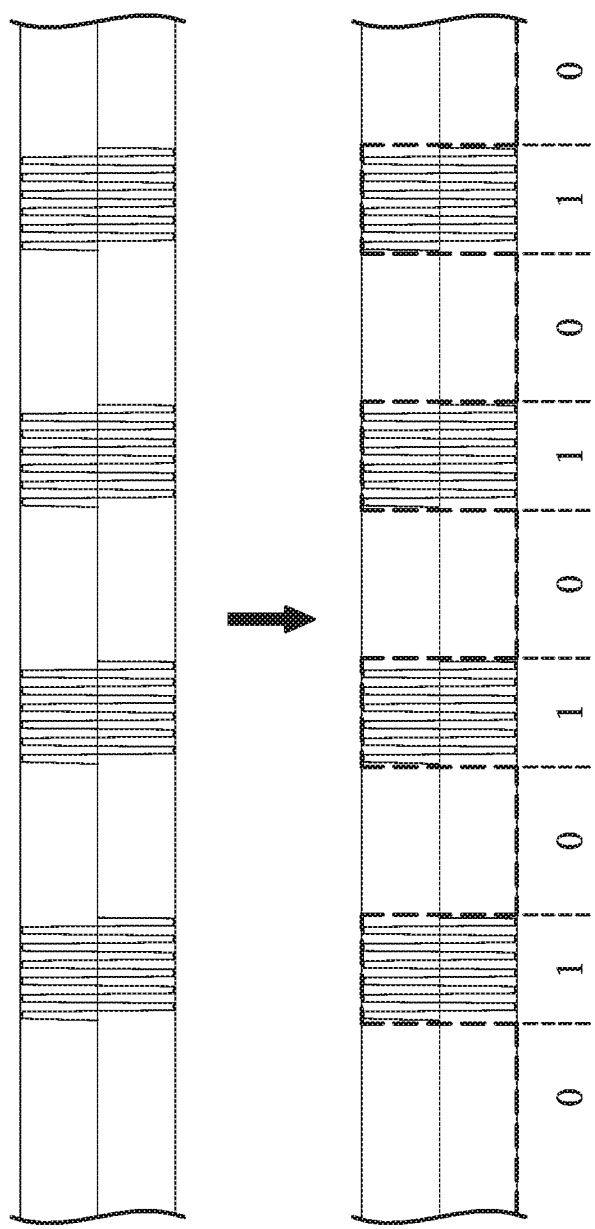
FIG. 2A is a schematic diagram of transforming the continuous signal to the digital square-wave signal according to an embodiment of the invention.

According to an embodiment of the invention, the processing device 120 may obtain the data signals from the first sound channel and obtain the clock signals from the second sound channel. The processing device 120 may transform the continuous data signals and the continuous clock signals to the digital square-wave signals. Taking FIG. 2A as an example, the processing device 120 may transform the signal with continuous frequency (e.g. sinusoidal-wave signal) to the square-wave signal which is indicated by logic levels 0 and 1.

Figure 2B:
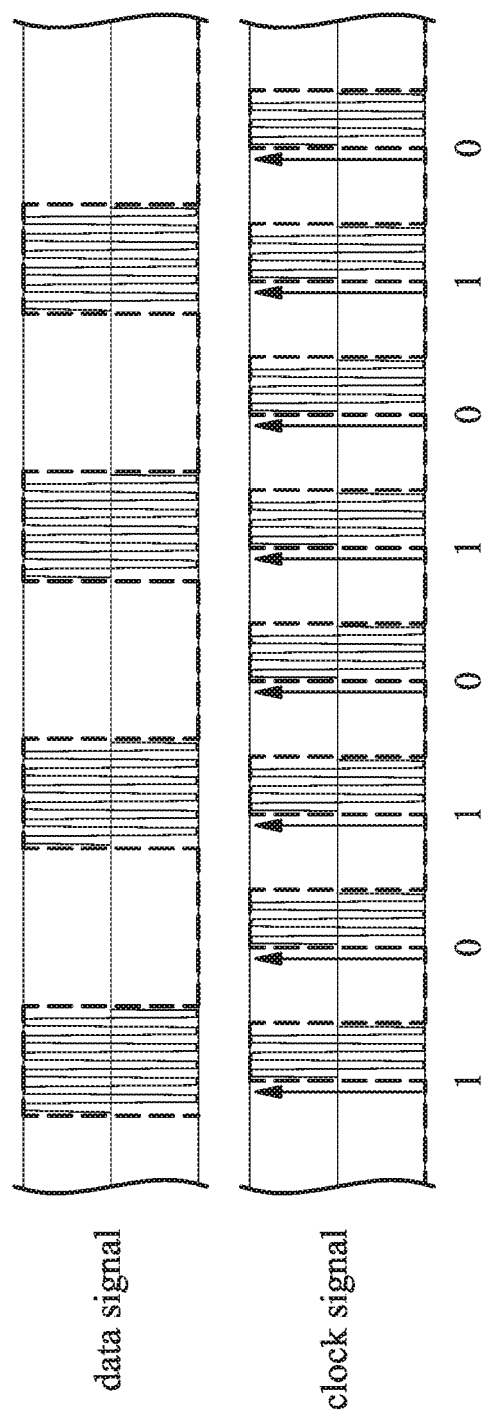
FIG. 2B is a schematic diagram of the extracted data signal according to an embodiment of the invention.

When the data signals and clock signals have been transformed to the square-wave signal, the processing 120 may extract the signals from the data signals at the rising edges of the clock signals, and decode the extracted data signals to obtain the command comprised in the data signals. Taking FIG. 2B as an example, the processing device 120 may extract the signal from the data signal at each rising edge of the clock signal. Therefore, the data signal extracted by the processing device 120 is 10101010. Then, the processing device 120 may decode the extracted data signal 10101010 to obtain the command comprised in the data signal. It should be noted that, in the embodiment, in order to avoid extracting wrong data signal at the rising edges of the clock signal, the level change of the data signal (e.g. the data signal is changed from 0 to 1, or the data signal is changed from 1 to 0) may only occur when the value of the clock signal is 0.

According to an embodiment of the invention, when the processing device 120 obtains the commands, the processing device 120 may store each command in a temporary storage queue (not shown in figures). In addition, according to an embodiment of the invention, a lookup table may be pre-stored in the storage device 130. According to an embodiment of the invention, the lookup table may comprise the operations corresponding to each command. When the processing device 120 has obtained the commands, the processing device 120 may read the lookup table from the storage device 130 according to the command stored in the temporary storage queue to obtain the operations corresponding to the commands stored in the temporary storage queue. Therefore, according to the information in the lookup table, the processing device 120 may perform the operations corresponding to each command.

According to an embodiment of the invention, when the processing device 120 starts to extract the signals from the data signals, the processing device 120 may enable a timer. When the processing device 120 has extracted the signals from the data signals, the processing device 120 may determine whether the timer has reached a default time (e.g. 3 second). If the timer has not reached the default time, the processing device 120 may not read the lookup table from the storage device 130 until the timer has reached the default time. If the timer has reached the default time, the processing device 120 may start to read the lookup table from the storage device 130.

When the audio signal starts to be played by the command processing device 100, start-oscillation noise may be generated. Therefore, according to an embodiment of the invention, in the clock signals, the first signal of the first group of clock signals will be set to have longer period. In addition, according to the embodiments of the invention, the processing device 120 may ignore the rising edge of the first signal of each group of clock signals (i.e. at the rising edge of the first signal, the processing device 120 may not extract the signals from the data signals). Therefore, according to the above operations for the clock signal, before extracting the signals from the data signals, the processing device 120 of the command processing device 100 may filter the start-oscillation noise first. Details for the setting of the clock signals may be better illustrated in FIG. 4 below.

Figure 3:
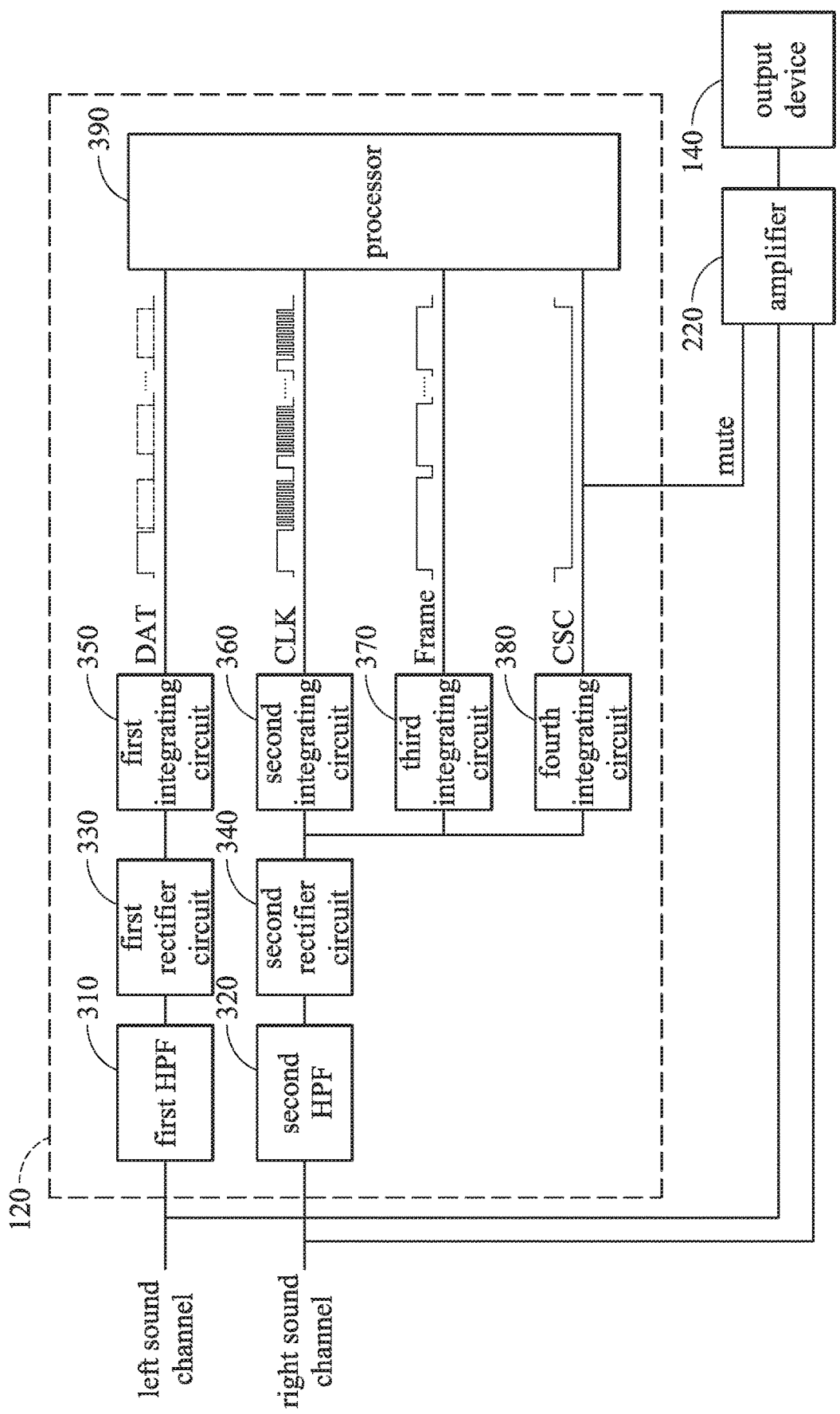
FIG. 3 is a block diagram of a processing device 120 according to an embodiment of the invention.

FIG. 3 is a block diagram of a processing device 120 according to an embodiment of the invention. As shown in FIG. 3, the processing device 120 may comprise a first high pass filter (HPF) 310, a second HPF 320, a first rectifier circuit 330, a second rectifier circuit 340, a first integrating circuit 350, a second integrating circuit 360, a third integrating circuit 370, a fourth integrating circuit 380, and a processor 390. It should be noted that, in order to clarify the concept of the invention, FIG. 3 presents a simplified block diagram in which only the elements relevant to the invention are shown. However, the invention should not be limited to what is shown in FIG. 3.

As shown in FIG. 3, according to an embodiment of the invention, after the processing device 120 obtains the data signals through the first sound channel, and obtains the clock signals through the second sound channel, the first HPF 310 and the second HPF 320 may filter the audio signal (i.e. the data signals and clock signals) whose frequency is lower than a threshold (15 KHz) in the first sound channel and the second sound channel. The hearing of most people is not sensitive to an audio signal whose frequency is higher than 15 KHz, therefore, in the embodiment of the invention, the commands may be carried on data signals whose frequency is higher than 15 KHz.

As shown in FIG. 3, according to an embodiment of the invention, when the data signals and the clock signals have been filtered by the first HPF 310 and the second HPF 320, the first rectifier circuit 330 and the second rectifier circuit 340 may enlarge the data signals and the clock signals and then perform a half-wave rectification on the enlarged data signals and the clock signals.

As shown in FIG. 3, according to an embodiment of the invention, the first integrating circuit 350 may transform the rectified data signals into a first square-wave signal DAT and transmit the first square-wave signal DAT to the processor 390. The second integrating circuit 360 may transform the rectified clock signals into a second square-wave signal CLK and transmit the second square-wave signal CLK to the processor 390. The third integrating circuit 370 may transform the rectified clock signals into a third square-wave signal Frame and transmits the third square-wave signal Frame to the processor 390. The fourth integrating circuit 380 may transform the rectified clock signals into a fourth square-wave signal CSC and transmit the fourth square-wave signal CSC to the processor 390.

According to another embodiment of the invention, the third integrating circuit 370 may transform the second square-wave signal CLK to a third square-wave signal Frame and transmits the third square-wave signal Frame to the processor 390. The fourth integrating circuit 380 may transform the third square-wave signal Frame to a fourth square-wave signal CSC and transmits the fourth square-wave signal CSC to the processor 390.

According to the embodiments of the invention, the first square-wave signal DAT may comprise a plurality data groups, and the second square-wave signal CLK may comprise a plurality groups of clock signals. Each data group may correspond to a group of clock signals, and each data group may correspond to its corresponding command.

According to the embodiments of the invention, the period of the third square-wave signal Frame may be longer than the period of the second square-wave signal CLK, and the period of the fourth square-wave signal CSC may be longer than the period of the third square-wave signal Frame. According to the embodiments of the invention, the periods of the first square-wave signal DAT, the second square-wave signal CLK, the third square-wave signal Frame and the fourth square-wave signal CSC may be adjusted by adjusting the resistors and the capacitances of the first integrating circuit 350, the second integrating circuit 360, the third integrating circuit 370 and the fourth integrating circuit 380.

According to an embodiment of the invention, the processor 390 may know when to start extracting each data group of first square-wave signal DAT and when to stop extracting each data group of first square-wave signal DAT according to the third square-wave signal Frame. Each signal of the third square-wave signal Frame may respectively correspond to a data group of first square-wave signal DAT, and may respectively correspond to a group of clock signals of the second square-wave signal CLK. Taking FIG. 4 as an example, at each rising edge of each signal of the third square-wave signal Frame, the processor 390 may start to extract the data group from the first square-wave signal DAT, and at each falling edge of each signal of the third square-wave signal Frame, the processor 390 may know the data group corresponding to each signal of the third square-wave signal Frame has been extracted. It should be noted that, because the time starting to generate the third square-wave signal Frame is slower than the initial time of the second square-wave signal CLK, therefore, in the embodiments of the invention, the processor 390 may ignore the rising edge of the first signal of each group of clock signals (i.e. the second square-wave signal CLK), i.e. at the rising edge of the first signal, the processor 390 may not extract the signal from the data signals (i.e. the first square-wave signal DAT). Namely, the processor 390 may start to extract the signals from the data signals (i.e. the first square-wave signal DAT) at the rising edge of the second signal of each group of clock signals.

According to an embodiment of the invention, the processor 390 may know that the transmission of the first square-wave signal DAT has been completed according to the fourth square-wave signal CSC. That is to say, the processor 390 may know that each data group of first square-wave signal DAT has been extracted (or know that each group of clock signals of the second square-wave signal CLK has terminated). For example, when the fourth square-wave signal CSC is in a first level, the processor 390 may determine that the extraction operation for the first square-wave signal DAT still needs to be performed, and when the fourth square-wave signal CSC is in a second level, the processor 390 may determine that each data group of first square-wave signal DAT has been extracted. Taking FIG. 4 as an example, when the fourth square-wave signal CSC is 0, the processor 390 may determine that the extraction operation for the first square-wave signal DAT still needs to be performed, and when the fourth square-wave signal CSC is 1, the processor 390 may determine that each data group of first square-wave signal DAT has been extracted.

In addition, according to an embodiment of the invention, the fourth square-wave signal CSC also may be transmitted to the output device 140 to be a mute signal "mute". That is to say, when the fourth square-wave signal CSC is in a first level (i.e. there is data signal needing to be extracted), the output device 140 may enter a muted state according to the mute signal "mute". In the embodiments of the invention, before the signals are transmitted to the output device 140, the signals may be processed by the amplifier 220.

Figure 4:
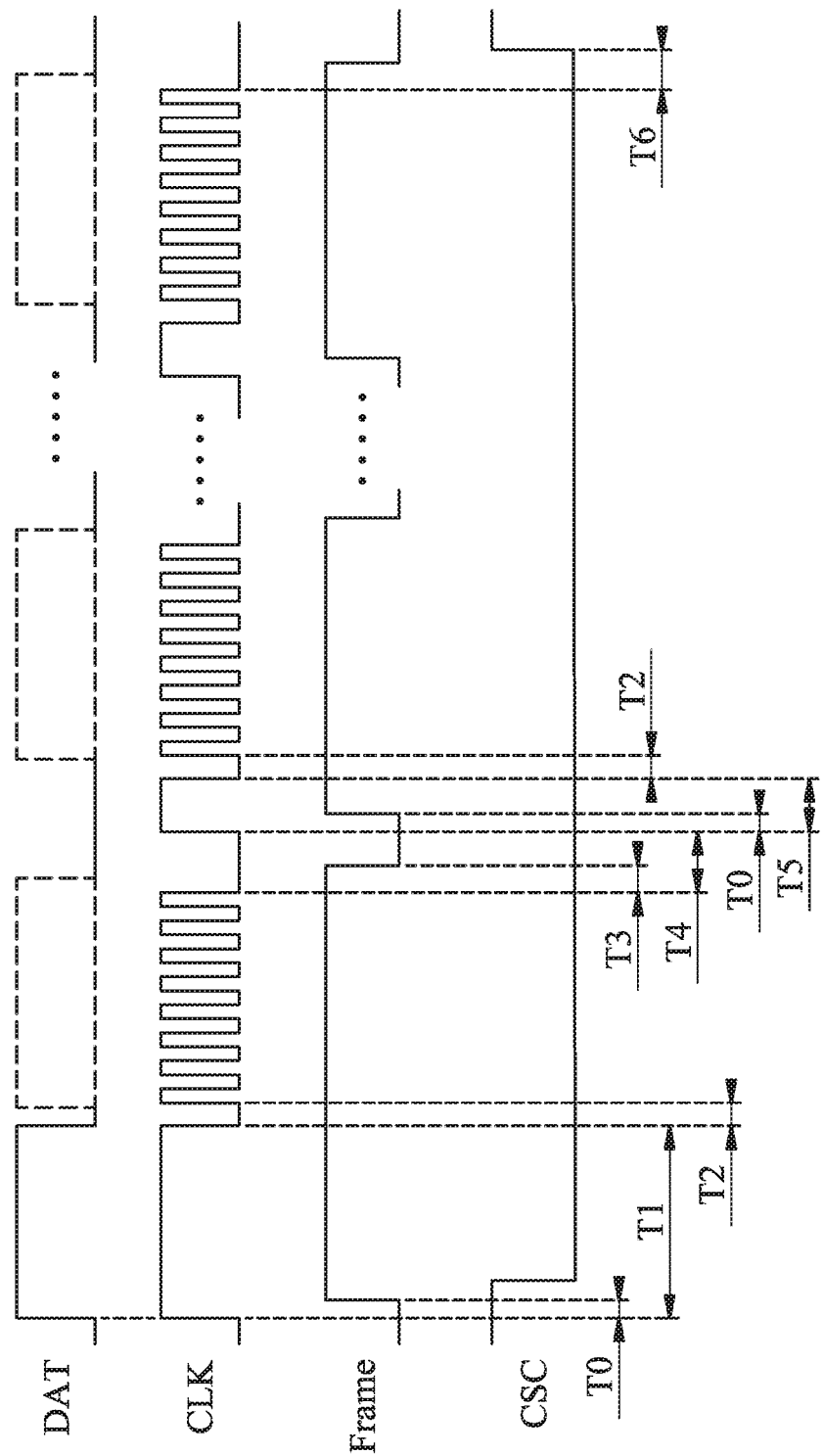
FIG. 4 is a waveform diagram of the first square-wave signal DAT, the second square-wave signal CLK, the third square-wave signal Frame and the fourth square-wave signal CSC according to an embodiment of the invention.

FIG. 4 is a waveform diagram of the first square-wave signal DAT, the second square-wave signal CLK, the third square-wave signal Frame and the fourth square-wave signal CSC according to an embodiment of the invention. It should be noted that the waveform diagram shown in FIG. 4 is merely used to illustrate the embodiment of the invention. However, the invention should not be limited to what is shown in FIG. 4. In addition, it should be noted that each square frame (represented by a dashed line) of the first square-wave signal DAT indicates a data group of first square-wave signals DAT, and not that the logic levels of all data groups of first square-wave signal DAT are 1.

As shown in FIG. 4, the time interval T0 means the delay time between the third square-wave signal Frame and the second square-wave signal CLK. The time interval T1 refers to the time for canceling the start-oscillation noise (i.e. the length of the first signal of the first group of clock signals), wherein the length of the time interval T1 needs to be longer than the length of the time interval T0 to ensure that, at the rising edge of the second signal of the first group of clock signals, the logic level of the first signal of the third square-wave signal Frame has changed to 1. Because the processing device 120 may ignore the rising edge of the first signal of each group of clock signals (i.e. the second square-wave signal CLK), the start-oscillation noise can be filtered.

The time interval T2 refers to the discharge time of the logic level of the first signal of each group of clock signals changing to 0.

The time interval T3 refers to the discharge time of the logic level of the third square-wave signal Frame corresponding to each data group changing to 0, when each data group has been extracted from the first square-wave signal DAT.

The time interval T4 refers to the time interval for extracting each data group, wherein the length of time interval T4 needs to be longer than the length of time interval T3.

The time interval T5 refers to the length of the first signal of each group of clock signals (except the first group of clock signals). There is no start-oscillation noise from the second group of clock signals, therefore the length of time interval T5 does not need to be as long as the length of time interval T1. However, the length of time interval T5 still needs to be longer than that of time interval T0 to ensure that, at the rising edge of the second signal of each group of clock signals, the logic level of the third square-wave signal Frame has changed to 1.

The time interval T6 refers to the time of the fourth square-wave signal CSC changing from 0 to 1, when the second square-wave signal CLK is terminated.

It should be noted that the triggers from the rising edge or the falling edge are merely used to illustrate the embodiments of the invention. However, the invention should not be limited thereto. In other embodiments, different edge-triggered methods can also be adopted.

FIG. 5 is a flow chart 500 illustrating the command processing method according to an embodiment of the invention. The command processing method is applicable to the command processing device 100. In step S510, a receiving device of the command processing device 100 may receive the audio signal from an electronic device, wherein the audio signal comprises the data signals and the clock signals, and the data signals corresponds to a first sound channel, and the clock signals correspond to the second sound channel. In step S520, the processing device of the command processing device 100 may obtain the data signals from the first sound channel and obtain the clock signal from the second sound channel. In step S530, the processing device of the command processing device 100 may obtain one or more commands according to the data signals and the clock signals. In step S540, the processing device of the command processing device 100 may perform corresponding operations according to the commands.

According to an embodiment of the invention, the command processing method may further comprise the processing device of the command processing device 100 extracting the signals from the data signals at each rising edge of the clock signals, and decoding the extracted data signals to obtain the commands.

According to an embodiment of the invention, the command processing method may further comprise the processing device of the command processing device 100 filtering the start-oscillation noise before extracting the signals from the data signals.

According to an embodiment of the invention, the command processing method may further comprise the processing device of the command processing device 100 filtering the audio signal whose frequency is lower than a threshold. In addition, the command processing method may further comprise the processing device of the command processing device 100 enlarging the data signals and the clock signals, and perform a half-wave rectification on the enlarged data signals and the clock signals.

In addition, the command processing method may further comprise the processing device of the command processing device 100 transforming the data signals into the first square-wave signal, and transforming the clock signals into the second square-wave signal, wherein the first square-wave signal and the second square-wave signal will be transmitted to the processor of the processing device. In addition, the command processing method may further comprise the processing device of the command processing device 100 transforming the clock signals into the third square-wave signal, and transforming the clock signals into the fourth square-wave signal wherein the third square-wave signal and the fourth square-wave signal will be transmitted to the processor of the processing device. In the embodiment, the period of the third square-wave signal is longer than the period of the second square-wave signal, and the period of the fourth square-wave signal is longer than the period of the third square-wave signal. In addition, in the embodiment, the processor of the processing device may obtain the commands by analyzing the first square-wave signal, the second square-wave signal, the third square-wave signal, and the fourth square-wave signal.

According to an embodiment of the invention, the command processing method may further comprise the first square-wave signal comprising a plurality of data groups, and the processor may know the start and the end of each data group according to the third square-wave signal. In addition, the processor may know that the transmission of the first square-wave signal has been completed according to the fourth square-wave signal.

According to an embodiment of the invention, the command processing method may further comprise a lookup table stored in a storage device of the command processing device 100. The lookup table may comprise the operations that correspond to each command. In the command processing method, the processing device of the command processing device 100 may perform the operation corresponding to each command according to the information in the lookup table.

The media that can be transmitted by instant messenger comprises text files, image files, audio files and video files. Therefore, if the commands need to be transmitted through the instant messenger, the commands need to be carried on the media (e.g. the text file, image file, audio file or video file). Then, the commands are extracted from the media. However, among these four types of media, text files and image files can only be directly displayed by the instant messenger, i.e. text files and image files cannot interface with other applications besides instant messenger. Furthermore, video files are difficult to process, and video files are too large. Therefore, in the command processing methods provided in the embodiments of the invention, the commands are carried on audio files to ensure that the commands can be transmitted through the instant messenger.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A command processing device, comprising:
   a receiving device, receiving an audio signal from an electronic device, wherein the audio signal comprises data signals and clock signals, and the data signals correspond to a first sound channel and the clock signals correspond to a second sound channel; and
   a processing device, coupled to the receiving device,
   wherein the processing device obtains the data signals from the first sound channel, and obtains the clock signals from the second sound channel, and
   wherein the processing device obtains one or more commands according to the data signals and clock signals, and performs operations corresponding to the commands.

2. The command processing device of claim 1, wherein at each rising edge of the clock signals, the processing device extracts information from the data signals, and decodes the extracted information to obtain the commands.

3. The command processing device of claim 2, wherein before the processing device extracts the information from the data signals, the processing device filters start-oscillation noise.

4. The command processing device of claim 1, further comprising:
   a processor;
   a first integrating circuit, transforming the data signals into a first square-wave signal and transmitting the first square-wave signal to the processor;
   a second integrating circuit, transforming the clock signals into a second square-wave signal and transmitting the second square-wave signal to the processor;
   a third integrating circuit, transforming the clock signals into a third square-wave signal and transmitting the third square-wave signal to the processor; and
   a fourth integrating circuit, transforming the clock signals into a fourth square-wave signal and transmitting the fourth square-wave signal to the processor,
   wherein the period of the third square-wave signal is longer than the period of the second square-wave signal, and the period of the fourth square-wave signal is longer than the period of the third square-wave signal.

5. The command processing device of claim 1, further comprising:
   a storage device, storing a lookup table, wherein the lookup table comprises the operations corresponding to the commands, and
   wherein the processing device performs the operations corresponding to each command according to the information in the lookup table.

6. A command processing method, applied to a command processing device, comprising:
   receiving, by a receiving device of the command processing device, an audio signal from an electronic device, wherein the audio signal comprises data signals and clock signals, and the data signals correspond to a first sound channel and the clock signals correspond to a second sound channel; and
   obtaining, by a processing device of the command processing device, the data signals from the first sound channel, and the clock signals from the second sound channel;
   obtaining, by the processing device, one or more commands according to the data signals and clock signals; and
   performing, by the processing device, operations corresponding to the commands.

7. The command processing method of claim 6, further comprising:
   at each rising edge of the clock signals, extracting information from the data signals; and
   decoding the extracted data information to obtain the commands.

8. The command processing method of claim 7, further comprising:
   before the processing device extracts the information from the data signals, filtering start-oscillation noise.

9. The command processing method of claim 6, further comprising:
   transforming the data signals into a first square-wave signal and transmitting the first square-wave signal to a processor of the processing device;
   transforming the clock signals into a second square-wave signal and transmitting the second square-wave signal to the processor;
   transforming the clock signals into a third square-wave signal and transmitting the third square-wave signal to the processor; and
   transforming the clock signals into a fourth square-wave signal and transmitting the fourth square-wave signal to the processor,
   wherein the period of the third square-wave signal is longer than the period of the second square-wave signal, and the period of the fourth square-wave signal is longer than the period of the third square-wave signal.

10. The command processing method of claim 6, further comprising:
    storing a lookup table in a storage device of the command processing device, wherein the lookup table comprises the operations corresponding to the commands; and
    performing the operations corresponding to each command according to the information in the lookup table.

* * * * *